United States Patent [19]
Garmy et al.

[11] Patent Number: 5,486,260
[45] Date of Patent: Jan. 23, 1996

[54] DEVICE FOR ASSEMBLY OF A TIRE CASING AND AN ANNULAR TREAD MEMBER EXTENDED BY CENTRIFUGATION

[75] Inventors: Michel Garmy, Le Cendre, France; Bernard Ravel, Nohanent, both of France

[73] Assignee: Compagnie Generale Des Etablissements Michelin - Michelin et Cie, Clermont-Ferrand

[21] Appl. No.: 263,301

[22] Filed: Jun. 21, 1994

[30] Foreign Application Priority Data

Jun. 25, 1993 [FR] France .................................... 93 07883

[51] Int. Cl.⁶ .................................................. B29D 30/56
[52] U.S. Cl. ........................ 156/406.2; 156/96; 156/127; 156/421.2; 156/421.8; 156/909
[58] Field of Search ........................ 156/96, 909, 406.2, 156/406.6, 421.8, 126, 127, 421.2

[56] References Cited

U.S. PATENT DOCUMENTS

| | | | |
|---|---|---|---|
| 2,822,027 | 2/1958 | Hollis | 156/127 |
| 3,151,013 | 9/1964 | Nebout | 156/406.2 |
| 3,769,121 | 10/1973 | Martin | 156/96 |
| 4,036,677 | 7/1977 | Marangoni | 156/421.6 |
| 4,178,198 | 12/1979 | Kent | 156/96 |
| 4,957,575 | 9/1990 | Cronin | 156/126 |

FOREIGN PATENT DOCUMENTS

| | | |
|---|---|---|
| 0540048 | 5/1993 | European Pat. Off. . |
| 57-84835 | 5/1982 | Japan . |
| 1119817 | 10/1984 | U.S.S.R. . |

*Primary Examiner*—Geoffrey L. Knable
*Attorney, Agent, or Firm*—Russell W. Warnock; Alan A. Csontos

[57] ABSTRACT

Process and device for assembly of a tire casing (2) and a prevulcanized annular tread member (1), in view of recapping tires whose tread member is worn or production of new tires, to which the annular tread member (1) is extended by centrifugation.

18 Claims, 5 Drawing Sheets

5,486,260

DEVICE FOR ASSEMBLY OF A TIRE CASING AND AN ANNULAR TREAD MEMBER EXTENDED BY CENTRIFUGATION

BACKGROUND OF THE INVENTION

The present invention refers to a process and a device for assembly of a prevulcanized annular tread member and a tire casing in view of either the recapping of tires whose tread member is worn, or the production of new tires.

The recapping of tires whose tread member is worn with a prevulcanized annular tread member is well known. U.S. Pat. No. 4,088,521 of Neal describes such an annular tread member with wings fitted on the upper part of the sides of the casing. U.S. Pat. No. 4,957,575 of Cronin reveals a device for assembly through extension of the annular tread member. The annular tread member is supported at its radially interior surface by bars which can spread radially among themselves and thus provide the extension necessary for assembly since such annular tread members have, at rest, a minimum diameter significantly smaller than the maximum outside diameter of the casing.

Such an assembly device presents however several problems. The average extension of the annular tread member is not homogeneous. On the other hand, contact is established between the bars and the radially interior surface of the annular tread member, surface which must then be put in contact with the outside surface of the casing and solidly adhere with it after vulcanization of a cushion gum—the cushion gum being a layer of vulcanizable rubber-based material interposed between the tread and the tire casing. This contact is likely to lead locally to adhesion defects between the annular tread member and the casing which can have later very serious consequences during operation. Finally, the operation of removing these bars after making an initial partial contact of the annular tread member onto the casing can also lead to more or less noticeable global and local misalignment of the annular tread member relative to the casing and thus to uniformity problems of the entire assembly in rotation.

SUMMARY OF THE INVENTION

The invention aims at mitigating the difficulties mentioned previously and notably providing a means of assembly which allows for guaranteeing good uniformity of the final product.

By tire "casing" we mean either a tire having run and the remainder of the worn tread member has been removed by a machining operation, or a new tire of which only the tread member is missing.

By "circumferential plane of reference" of an annular tread member or a tire casing, we mean a plane perpendicular to the axis of symmetry of the said tread member or said casing which serves as reference for positioning said tread member relative to said casing. We call these planes P1 and P2 respectively.

According to the present invention, there is provided a process of assembling a tire casing and a prevulcanized annular tread member which includes the steps in which:

the annular tread member is placed on the radially interior surface of the annular means of support of the tread member, said means of support being deformable under the effect of a radial stress directed toward the outside;

the annular means of support of the tread member is put in rotation to extend the annular tread member by centrifugation so that, in the extended state, its smallest diameter is greater than the largest diameter of the tire casing;

the tire casing is placed in a zone adjacent to the tread member so that their circumferential planes of reference coincide; and the extension of the tread member is reduced such that it makes contact with the tire casing.

Holding the tread member by its radially exterior surface during the entire assembly allows for eliminating any contact with its radially interior surface intended to be adhered to the casing. Problems of misalignment associated with removal of the means of extension disappear also.

The means of support of the annular tread member assures an axial and circumferential positioning of the said annular tread member during the entire assembly.

According to one preferred embodiment of the process and device according to the invention, the means of support of the annular tread member as well as those of the casing are put in rotation simultaneously.

The establishment of contact of the radially interior surface of the annular tread member and the crown of the casing can be done in a vacuum.

Another aspect of the process according to the invention is characterized in that, after having established contact of the radially interior surface of the annular tread member and the crown of the casing, the contact zone is subjected to a static pressure.

This static pressure of application, on the entire contact zone between the annular tread member and the casing, together with establishment of contact in a vacuum allow for providing a very large effective surface of contact and excellent adhesion between the two parts.

The invention also provides a device for assembling a tire casing and a prevulcanized annular tread member, comprised of a frame and means of support of the annular tread member and the tire casing, characterized in that the said means of support is mounted rotating relative to the frame and in that the said device includes the means of starting rotation of the said means of support.

According to another characteristic of the assembly device of the invention, the deformability of the means of support of the annular tread member is less than that of the said annular tread member.

This characteristic ensures that at the time of the start of rotation of the annular tread member on its means of support, the said annular tread member remains constantly in contact with the said means of support which guarantees its good drive in rotation and its good positioning.

The process and the assembly device according to the invention thus provide a homogeneous distribution of the stresses in the annular tread member during and after the assembly and respect the integrity of the surfaces before their contact. The reproducibility of the assembly is also excellent through the almost complete elimination of effects due to the operators.

BRIEF DESCRIPTION OF THE DRAWINGS

The following figures illustrate the assembly process according to the invention and describe the method of making the device for its implementation.

DETAILED DESCRIPTION OF THE PREFERRED EMBODIMENTS

Figure 1:
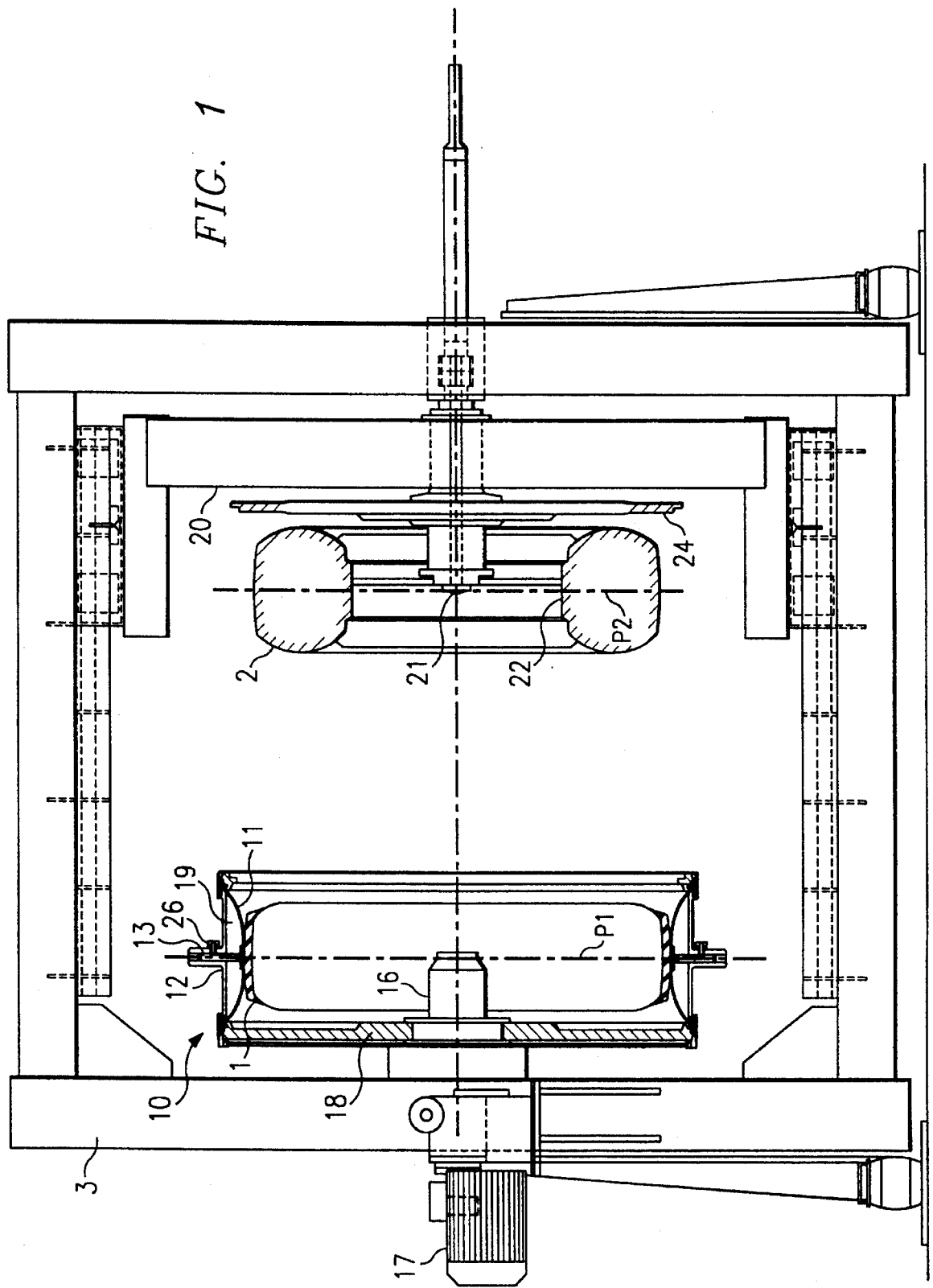
FIG. 1 is a vertical section view of an assembly device, section passing through the axis of rotation of the means of support of the tread member and the casing, before assembly.
Figure 2:
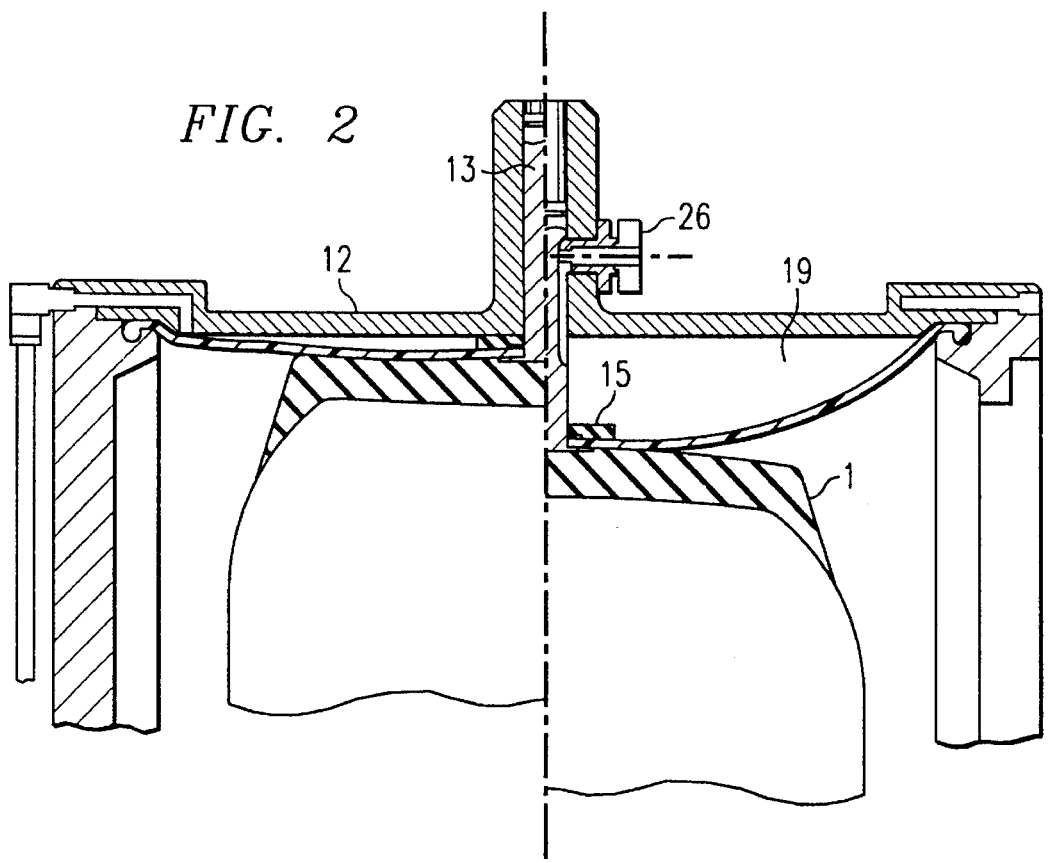
FIG. 2 represents a detail of FIG. 1 relative to the means of support of the annular tread member, before centrifugation, right half-section, and during centrifugation, left half-section.

As seen in FIGS. 1–7, the preferred embodiment of the device of the present invention is illustrated. As seen in FIG. 1, an assembly device of an annular tread member 1 on a tire casing 2 allows for making the extension of the said annular tread member 1 necessary to allow its placement on the casing 2 by centrifugation.

It includes the means of support 10 of the annular tread member 1 which includes a deformable membrane 11, for example in rubber, of an approximately semi-toric shape, mounted on the inside of a cylindrical support 12. This membrane 11 is preferably equipped so that its circumferential rigidity is less than its transversal rigidity. The inside diameter of the membrane 11 is adjustable by putting into internal depression the chamber 19 formed between the cylindrical support 12 and the said membrane 11. As in a resting position, the diameter of the membrane 11 is slightly less than that of the different annular tread members which it is possible to assemble with this device. This putting into depression allows a fine adjustment of its diameter according to the annular tread member 1 used so that the latter is sufficiently clasped to drive it in rotation with membrane 11.

The circumferential plane of symmetry of membrane 11 is drilled with n equally spaced holes. The value of n is, for instance, 12, 18 or 34. These holes are used to attach n attachment elements 13 (FIGS. 3 and 4) comprised of an extended shaft 131 drilled with a groove 29 and ended on one side only by a flange 132 and an enlarged base 133. The edges of the holes of membrane 11 are gripped in an airtight manner between the flanges 132 and the enlarged bases 133. The shafts 131 run radially into n housings 134 planned in the circumferential plane of symmetry of the cylindrical support 12.

The circumferential planes of symmetry of membrane 11 and of cylindrical support 12 are therefore kept continuously coincident regardless of the diameter of said membrane 11.

At the radially interior end of a fraction f of the attachment elements 13, for example every other one, is attached, in a removable way, a tip 14 whose shape is suitable for fitting together into a groove of the tread pattern of the annular tread member 1 and thus prohibit in particular any axial or circumferential movement of said tread member 1 relative to membrane 11. These tips 14 act as liaison points between the annular tread member 1 and membrane 11.

Their function is to keep the circumferential plane of reference P1 of the annular tread member 1 coincident with the circumferential plane of symmetry of membrane 11. These tips 14, fitting into the tread patterns, do not separate the annular tread member 1 from the radially interior surface of membrane 11, but they can move radially with it at the time of its circumferential extension.

Figure 3:
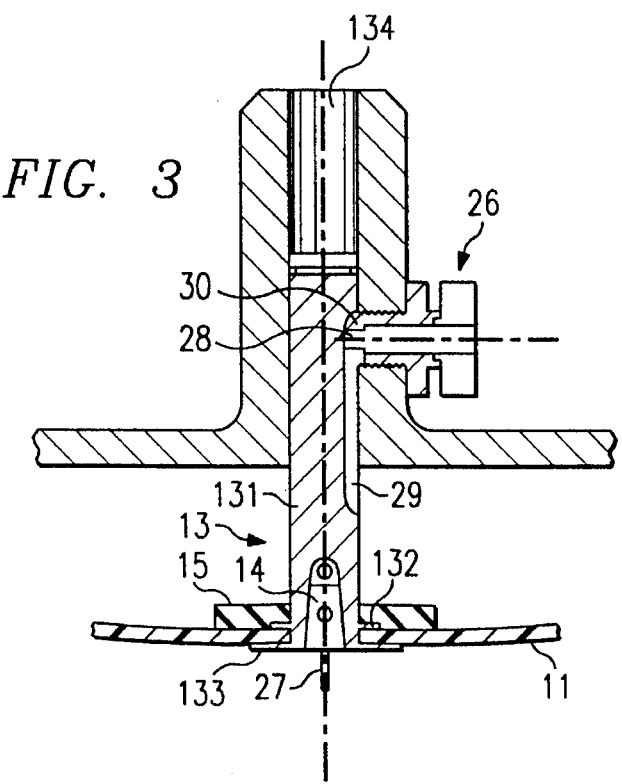
FIG. 3 shows a front section of the attachment devices of the annular tread member.
Figure 4:
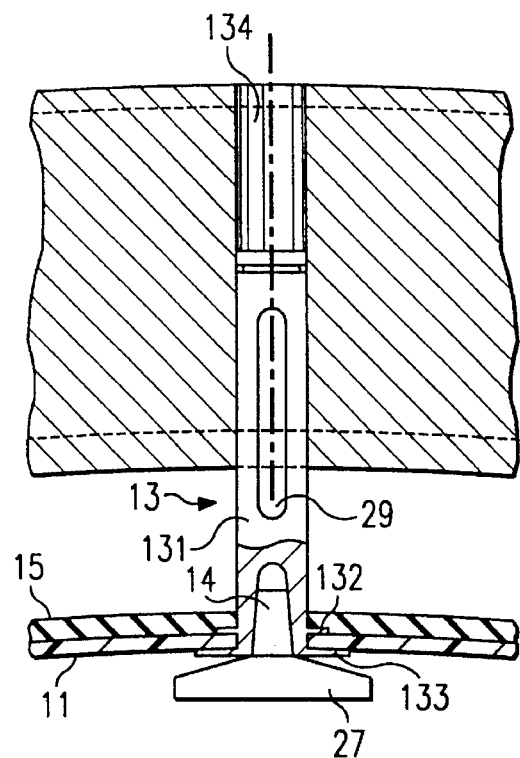
FIG. 4 shows a side section of the attachment devices of the annular tread member.

On FIGS. 3 and 4 we see a front and side view of an example of such tips 14, in case the shape fitting into the tread pattern of the annular tread member 1 is a simple sipe 27.

The magnitude of the radial displacement of the attachment elements 13 according to the diameter of the annular tread members 1 used is set by device 26. In the case of two diameters of annular tread member 1, this device 26 includes an index 28 at two axial positions. This index 28 is placed in a groove 29 of the attachment element 13 and thus limits the radial displacement of the attachment element in two ranges of length defined by the length of the said groove 29 and a pair of disengagement positions 30 each at a respective axial end position of the groove 29 for disengagement of the index 28 from the groove 29.

During the entire centrifugation, it is necessary that contact be maintained between the radially exterior surface of the annular tread member 1 and the radially interior surface of the means of support 10 in order to guarantee driving of the said annular tread member 1 and its good positioning relative to the circumferential plane of symmetry of the cylindrical support 12. The proper circumferential extension of membrane 11, under the action of centrifugal forces, should therefore not be greater than that of the annular tread member 1, or, otherwise said, the "circumferential deformability" of membrane 11 under the action of centrifugal forces should be less than that of the annular tread member 1. For that purpose, a rubber band 15 (FIG. 2, 3, 4), of an approximately cylindrical shape, is placed against the radially exterior surface of membrane 11 and symmetrically relative to the circumferential plane of symmetry of the said membrane. This band 15, whose diameter is less than that of the membrane in resting position, decreases the deformability of the central part of membrane 11.

The cylindrical support 12 is mounted, through the use of a side plate 18, on a hub 16 driven by motor 17, itself supported by the support 3 ( FIG. 1 ) .

The support 3 receives a cart 20 which supports a second hub 21 on which a wheel 22 can be mounted which supports the inflated casing 2. The path of the cart 20 is such that the two circumferential planes of reference P2 and P1 of the casing 2 and the tread member 1 can be brought into coincidence.

These two hubs 16 and 21 have the same axis of rotation and can be connected by a telescoping polygonal shaft 23 which allows for driving the hub 21 by the motor 17 and thus guaranteeing, at any instant, the same angular speed for both hubs.

Hub 21 also supports a side plate 24 whose geometry is adapted to that of the cylindrical support 12. When the circumferential planes of reference P2 and P1 of the casing 2 and the annular tread member 1 are brought into coincidence by translation of the cart 20 (FIG. 5), this side plate 24 is applied against the side of the cylindrical support 12 and closes an airtight chamber 25 comprised of side plates 18 and 24, the cylindrical support 12 and the membrane 11. In this chamber 25 is found the entire casing 2 and annular tread member 1. The vacuum can be made in this airtight chamber 25 by means of a vacuum pump and rotating joints not shown.

The assembly process according to the invention is now described in the case of recapping of the worn tread member of a tire, by referring to the preceding device.

Figure 7:
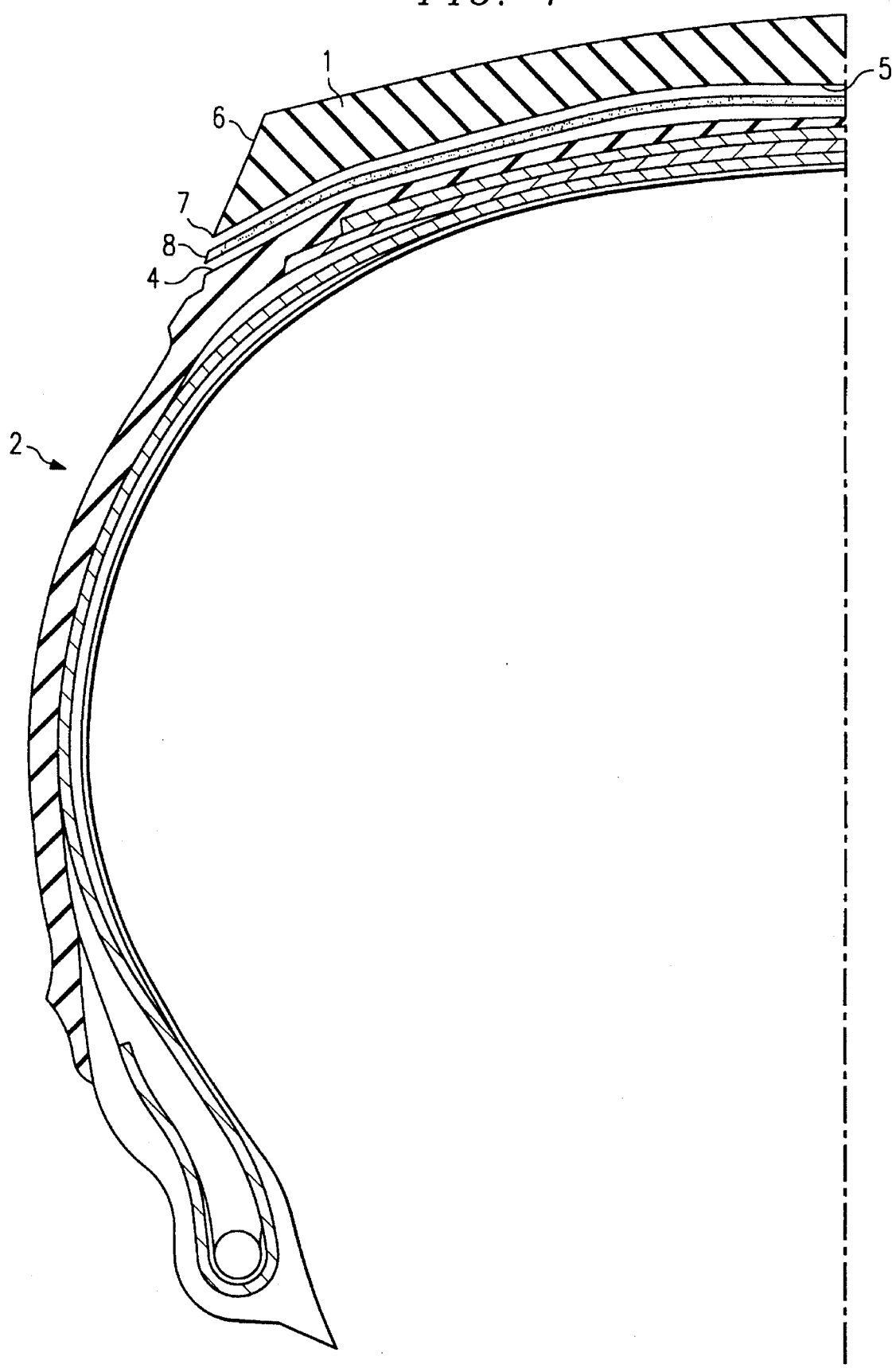
FIG. 7 shows a partially expanded axial cross section of an assembly of casing, cushion gum and annular tread member.

FIG. 7 shows a partially expanded axial cross-section of an assembly of casing 2, cushion gum 8 and prevulcanized annular tread member 1.

The annular tread member 1 has an inside diameter in its circumferential plane P1 slightly less than the outside diameter of the casing 2 prepared for assembly in its circumferential plane P2 so that after assembly, the tread member 1 is in a slightly extended state and binds the said casing 2.

After having prepared in a known manner the radially exterior surfaces 4 of the casing 2 and radially interior surfaces 5 of the annular tread member 1 and placed, if necessary, a cushion gum 8 on one of the said surfaces, the casing 2 is positioned and inflated on the wheel 22 and the hub 21, then the annular tread member 1 is installed on the radially interior surface of the membrane 11 while verifying the correct positioning of the attachment devices 14 and centering devices of the annular tread member 1 on the membrane 11. The diameter of the membrane 11 is set so that it is slightly less than that of the annular tread member 1 to facilitate manual mounting.

The cart 20 is then displaced as far as an intermediate position A (FIG. 6) and both hubs 16 and 21 are coupled by the telescoping polygonal shaft 23.

The entire unit is put in rotation by motor 17.

The membrane 11 reinforced in its central part by the band 15, while expanding, remains constantly in contact with the annular tread member in its central part, all while leaving the edges of the said annular tread member 1 free to deform more.

When the centrifugal acceleration reaches about 800 m/s$^2$, or a speed of rotation of about 350 rpm, in the case of a heavy truck tire of diameter 1.20 m, the radial expansion of the annular tread member 1 is sufficient, at the center and on its edges to allow passage of the casing 2.

Figure 5:
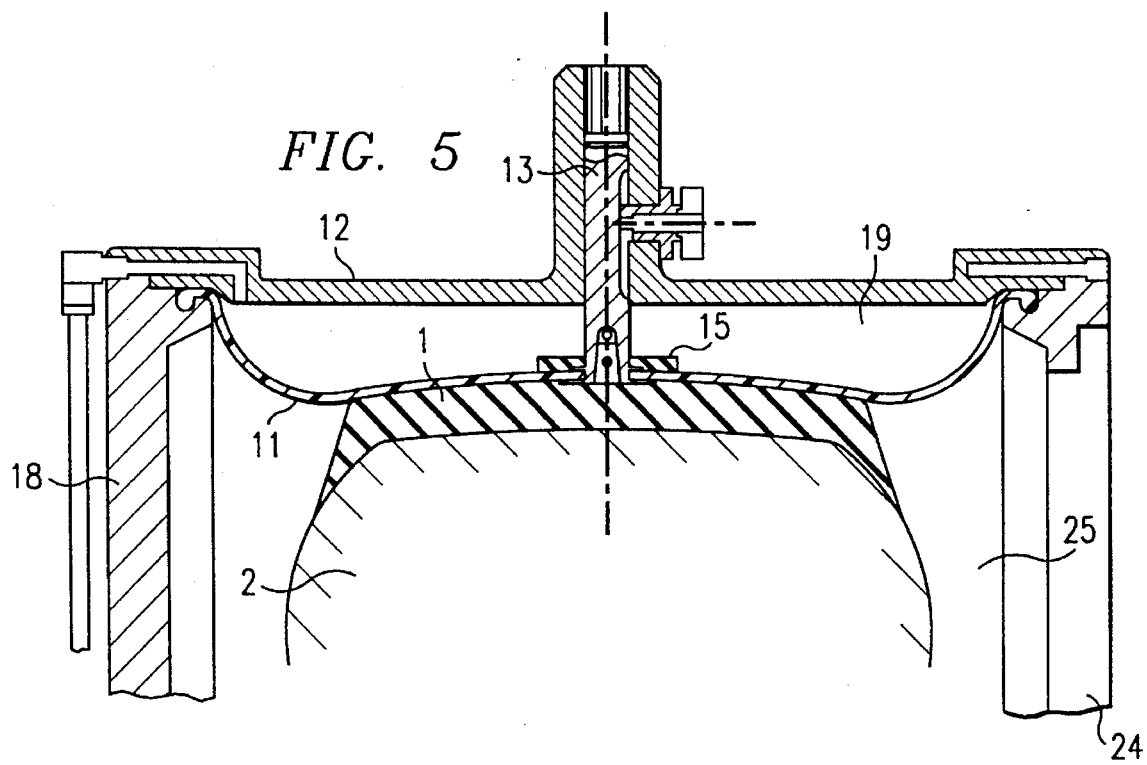
FIG. 5 shows a cross section similar to FIG. 2 of the means of support of the annular tread member after assembly.
Figure 6:
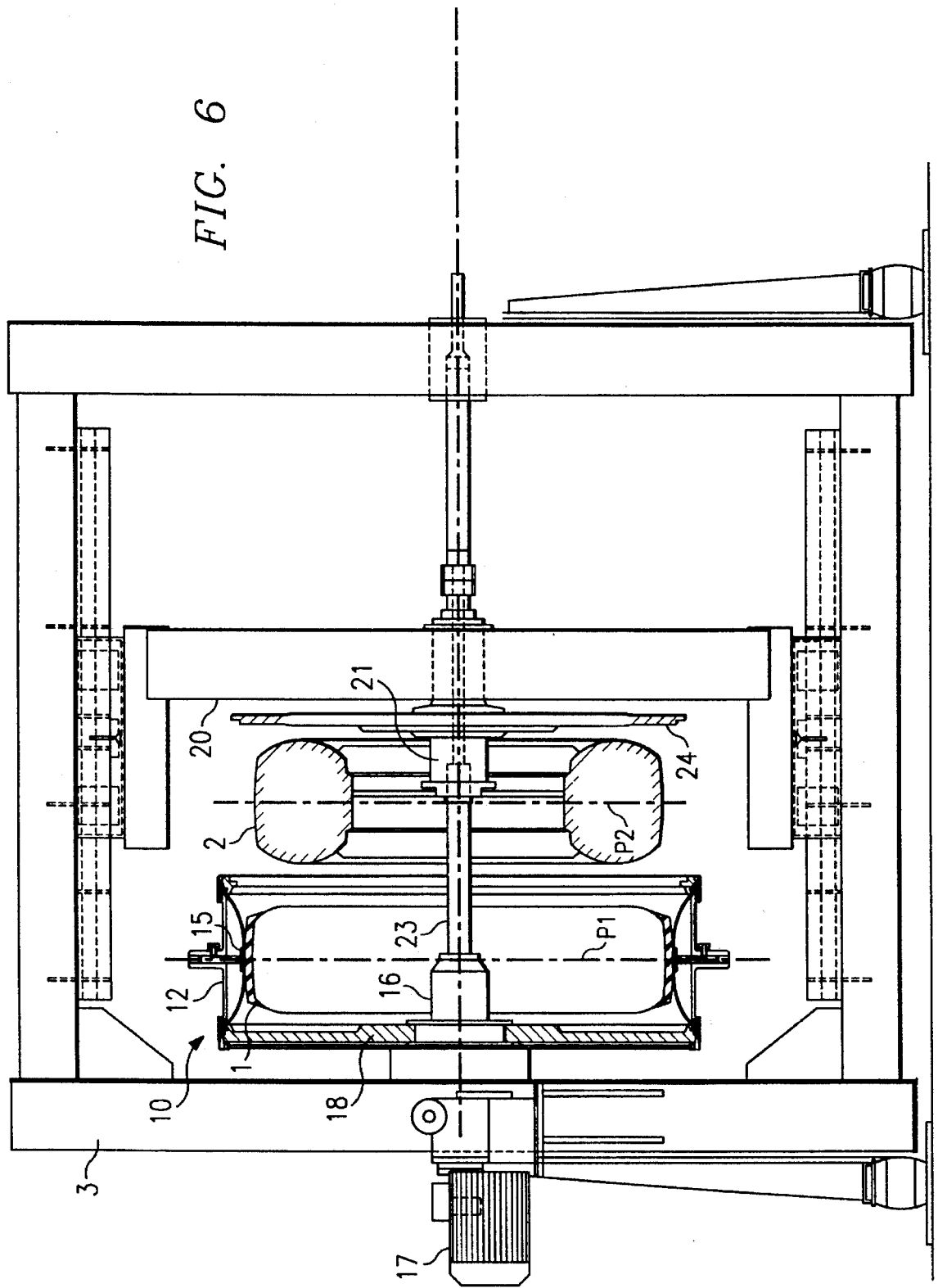
FIG. 6, similar to FIG. 1, shows the means of driving the device, coupled.

The cart 20 is then displaced as far as position B (FIG. 5). In this position, the circumferential planes of reference P1 and P2 of the annular tread member 1 and the casing 2 coincide and the side plate 24 is applied against the side of the cylindrical support 12 which makes the chamber 25 airtight.

This chamber 25 and the interior 19 of the membrane 11 are then evacuated to a reduced pressure to an absolute pressure of 50 to 300 mbars.

A progressive decrease of the speed of rotation together with the venting to the atmospheric pressure of the interior 19 of the membrane 11 will cause contraction of the annular tread member 1 and its progressive establishment of contact with the radially exterior surface of the casing 2.

This establishment of contact is accomplished circumferentially and progressively, first at the center then on the edges.

When the entire radially interior surface of the annular tread member 1 has been put in contact with the radially exterior surface of the casing 2, the pressure of the chamber 19 is increased up to a value of about 2 to 3 bars absolute to apply an approximately normal pressure on the entire zone which has just been put in contact. This pressure of application, kept from several seconds to several tens of seconds, and the establishment of contact under vacuum has the purpose of providing close contact between the two surfaces in contact.

The application of this normal pressure can happen before the rotation of the assembly stops completely, or afterwards.

If necessary, the establishment of contact between the annular tread member 1 and the casing 2 can be completed by a rolling or static pressing of the edges 6 of the said tread member 1 and notably of their points 7.

The chamber 25 is finally vented to open air and the pressure is reduced in the chamber 19 between the membrane 11 and the cylindrical support 12. The membrane 11 separates from the annular tread member 1. The cart is moved to its original position.

The entire annular tread member 1 and casing 2 is then transferred to the means of vulcanization after placement of a vulcanization flexible envelope, if necessary.

The quality and reproducibility of the assembly obtained with the process and the device according to the invention are excellent. As an example, the differences of centering obtained between the annular tread member 1 and the circumferential plane P2 of the casing 2 are easily less than 1 mm on the entire circumference of the tire. The uniformity in rotation of the tires obtained is thus, itself, excellent. Finally, this method of assembly allows for solving most difficulties related to vulcanizations done without using a vulcanization flexible envelope.

The binding of the annular tread member 1 onto the casing 2 after assembly, as well as to conformity between the profiles of the surfaces of the said annular tread member 1 and the said casing 2, which have just been put in contact, are such that the use of solutions, classically intended to increase the uncured adhesion of the surfaces which should be put in contact, might no longer be necessary.

The process is also applicable to use of a classical flat tread member. It suffices to put it in ring shape with a joint, even not vulcanized, before placing it on the means of support 10.

We claim:

1. Device for assembling tire casing and a prevulcanized annular tread member, comprising:

a frame;

first means of support of said annular tread member;

second means of support of said tire casing;

means for relative displacement of said first and second means of support to make the circumferential planes of reference of said annular tread member and of said tire casing substantially coincide; and said first and second means of support being mounted rotatably to the frame and having means for putting, at least, said first means of support into rotation to cause centrifugal expansion of said annular tread member, wherein, sold first means of support of said annular tread member have means for engaging the radially exterior surface of said annular tread member initially before rotation of said annular tread member and thereafter continuing to engage said annular tread member during rotation thereof.

2. Device according to claim 1, wherein said first means of support of said annular tread member includes a membrane of a semi-toric shape mounted on the interior of a cylindrical support, the inside diameter of said membrane being adjustable.

3. Device according to claim 2, wherein the inside diameter of the membrane is adjustable by modifying the pressure on the inside of a chamber formed by said membrane and said cylindrical support.

4. Device according to claim 2, wherein the axial end circumferential positioning of the plane of symmetry of said membrane is provided by at least two attachment elements distributed in the same circumferential plane of said cylindrical support, of which one end is attached to said cylindrical support, and the other end, slidable radially, is attached to said membrane in its plane of symmetry.

5. Device according to claim 4, wherein a fraction f of said elements of attachment have, on the side of its end attached to said membrane, a removable device of a shape adapted to the tread pattern of the annular tread member which provides axial and circumferential positioning of said tread member during the entire assembly.

6. Device according to claim 2, wherein said first means of support has a first flange connected with said cylindrical support, said second means of support has a second flange for forming with said first flange and said cylindrical support a closed cavity when said circumferential planes of reference of said annular tread member and of tire casing substantially coincide, and wherein said device further has means for establishing vacuum inside said cavity.

7. Device for assembling tire casing and a prevulcanized annular tread member, comprising:

a frame;

first means of support of said annular tread member;

second means of support of said tire casing;

means for relative displacement of said first and second means of support to make the circumferential planes of reference of said annular tread member and of said tire casing substantially coincide; and said first and second means of support being mounted rotatably to the frame and having means for putting, at least, said first means of support into rotation to cause centrifugal expansion of said annular tread member, wherein said first means of support of said annular tread member has means for positioning the circumferential plane of reference of said treed member relative to said first means of support, said means for positioning engaging the exterior surface of the annular tread member before and during the rotation of said annular tread member.

8. Device according to claim 7, wherein said first means of support of said annular tread member includes a membrane of a semi-toric shape mounted on the interior of a cylindrical support, the inside diameter of said membrane being adjustable.

9. Device according to claim 8, wherein the inside diameter of the membrane is adjustable by modifying the pressure on the inside of a chamber formed by said membrane and said cylindrical support.

10. Device according to claim 8, wherein the axial and circumferential positioning of the plane of symmetry of said membrane is provided by at least two attachment elements distributed in the same circumferential plane of said cylindrical support, of which one end is attached to said cylindrical support, and the other end, slidable radially, is attached to said membrane in its plane of symmetry.

11. Device according to claim 10, wherein a fraction f of said elements of attachment have, on the side of its end attached to said membrane, a removable device of a shape adapted to the tread pattern of the annular tread member which provides axial and circumferential positioning of said tread member during the entire assembly.

12. Device according to claim 8, wherein said first means of support has a first flange connected with said cylindrical support, said second means of support has a second flange for forming with said first flange and said cylindrical support a closed cavity when said circumferential planes of reference of said annular tread member and of tire casing substantially coincide, and wherein said device further has means for establishing vacuum inside said cavity, 13. Device for assembling a tire casing and a prevulcanized annular tread member, the prevulcanized annular tread member and the tire casing each having a circumferential plane of reference and the annular tread member having a radially outer surface and a radially interior surface, the device comprising:

first support means for supporting said annular tread member during centrifugal expansion thereof in the course of which the diameter of said annular tread member increases from an initial diameter to an expanded diameter larger than the initial diameter due to the effect of centrifugal forces acting on said annular tread member;

means for rotating said first support means to centrifugally expand the annular tread member, said first support means including means for continuously engaging the same engagement area of said annular tread member from at least the beginning of rotation of said annular tread member when said annular tread member is at its initial diameter to at least a later time at which said annular tread member has been centrifugally expanded to an expanded diameter;

second support means for supporting said tire casing; and means for displacing said first end second support means relative to one another between a first position in which the circumferential planes of reference of said annular tread member and said tire casing are not aligned with one another end a second position in which the circumferential planes of reference of said annular tread member and said tire casing are substantially aligned with one another.

14. Device according to claim 13, wherein said first means of support of said annular tread member includes a membrane of a semi-toric shape mounted on the interior of a cylindrical support, the inside diameter of said membrane being adjustable.

15. Device according to claim 14, wherein the inside diameter of the membrane is adjustable by modifying the pressure on the inside of a chamber formed by said membrane and said cylindrical support.

16. Device according to claim 15, wherein the axial and circumferential positioning of the plane of symmetry of said membrane is provided by at least two attachment elements distributed in the same circumferential plane of said cylindrical support, of which one end is attached to said cylindrical support, and the other end, slidable radially, is attached to said membrane in its plane of symmetry.

17. Device according to claim 16, wherein a fraction f of said elements of attachment have, on the side of its end attached to said membrane, a removable device of a shape adapted to the tread pattern of the annular tread member which provides axial end circumferential positioning of said tread member during the entire assembly, 18. Device according to claim 15, wherein said first means of support has a first flange connected with said cylindrical support, said second means of support has a second flange for forming with said first flange and said cylindrical support a closed cavity when said circumferential planes of reference of said annular tread member and of tire casing substantially coincide, and wherein said device further has means for establishing vacuum inside said cavity.

* * * * *